United States Patent [19]

Koumo et al.

[11] Patent Number: 5,241,489

[45] Date of Patent: Aug. 31, 1993

[54] ELECTRONIC COMPUTER WITH FRACTION AND EXPONENT DISPLAY

[75] Inventors: Hideyasu Koumo, Yamatokoriyama; Fumiaki Kawawaki; Noboru Akizuki, both of Nara, all of Japan

[73] Assignee: Sharp Kabushiki Kaisha, Osaka, Japan

[21] Appl. No.: 589,656

[22] Filed: Sep. 28, 1990

[30] Foreign Application Priority Data

Oct. 2, 1989 [JP] Japan .................................. 1-258384
Oct. 2, 1989 [JP] Japan .................................. 1-258385
Oct. 2, 1989 [JP] Japan .................................. 1-258386

[51] Int. Cl.⁵ .............................................. G06F 3/00
[52] U.S. Cl. .............................................. 364/710.10
[58] Field of Search ..................... 364/710.01, 710.10, 364/709.07

[56] References Cited

U.S. PATENT DOCUMENTS

| | | | |
|---|---|---|---|
| 4,488,250 | 12/1984 | Lipsey et al. | 364/710.10 |
| 4,545,022 | 10/1985 | Hughins | 364/709 |
| 4,744,044 | 5/1988 | Stover et al. | 364/709 |
| 4,800,514 | 1/1989 | Earle | 364/710.10 |
| 5,025,403 | 6/1991 | Stephens | 364/709.07 |
| 5,067,102 | 11/1991 | Eisenstein | 364/709.12 |

FOREIGN PATENT DOCUMENTS 53-126218 11/1978 Japan .
55-80862 6/1980 Japan .

OTHER PUBLICATIONS

Patents Abstracts of Japan vol. 13, No. 245 (P-881)(3593) Jun. 8, 1989 & JP-A-1 46 828 (NEC Corp.) Feb. 21, 1989.
"Word Perfect ® Wordbook for IBM ® Personal Computers", version 5.1, Copyright by Word Perfect Corporation 1989, pp. 335-341.
"Programming for the Sciences Application for the SHARP EL-512 Scientific Calculator", Copyright by Sharp Electronics Corporation 1983, pp. 10-11, 22-23.

Primary Examiner—Long T. Nguyen
Attorney, Agent, or Firm—Nixon & Vanderhye

[57] ABSTRACT

A portable electronic computer for conducting fraction calculations has a display including a first multiple-digit display area for displaying the numerator of a fraction, and a second multiple-digit display area for displaying the denominator of the fraction. The numbers of digits of the numerator and denominator of a fraction to be displayed are obtained. The number of digits of the numerator is compared with the number of digits of the denominator. The difference between the number of digits of the numerator and the number of digits of the denominator is calculated. When the number of digits of the numerator is smaller than the number of digits of the denominator, the numerator is displayed on the first display area with its position shifted to an upper digit place according to the difference. When the number of digits of the denominator is smaller than the number of digits of the numerator, the denominator is displayed on the second display area with its position shifted to an upper digit place according to the difference.

13 Claims, 12 Drawing Sheets

Fig. 4

| | KEY OPERATION | DISPLAY | | NOTES |
|---|---|---|---|---|
| | | MAIN DISPLAY | FRACTION DISPLAY | |
| A | 3 a b/c 9 9 9 | | $\frac{\phantom{9}}{9}\frac{\phantom{9}}{9}\frac{3}{9}$ | INPUT FRACTION |
| B | = | | $\frac{\phantom{3}}{3}\frac{1}{3}\frac{\phantom{3}}{3}$ | DETERMINE FRACTION |
| C | 3 5 5 a b/c 3 | | $\frac{3}{\phantom{3}}\frac{5}{\phantom{3}}\frac{5}{3}$ | INPUT FRACTION |
| D | = | 1 1 8 | $\frac{1}{3}$ | DETERMINE FRACTION |
| E | 2nd F a b/c | | $\frac{3}{\phantom{3}}\frac{5}{3}\frac{5}{\phantom{3}}$ | MIXED →IMPROPER |

Fig. 5

| FRACTION BEFORE SHAPING | DIFFERENCE BETWEEN NUMERATOR AND DENOMINATOR | NUMBER OF DIGITS TO BE SHIFTED | FRACTION AFTER SHAPING | HANDWRITTEN FRACTION |
|---|---|---|---|---|
| $\frac{\phantom{1}\phantom{2}1}{1\,2\,3}$ | 2 | 1 | $\frac{\phantom{1}1\phantom{3}}{1\,2\,3}$ | $\frac{1}{123}$ |
| $\frac{\phantom{1}\phantom{2}\phantom{3}1}{1\,2\,3\,4}$ | 3 | 1 | $\frac{\phantom{1}\phantom{2}1\phantom{4}}{1\,2\,3\,4}$ | $\frac{1}{1234}$ |
| $\frac{\phantom{1}\phantom{2}\phantom{3}\phantom{4}1}{1\,2\,3\,4\,5}$ | 4 | 2 | $\frac{\phantom{1}\phantom{2}1\phantom{4}\phantom{5}}{1\,2\,3\,4\,5}$ | $\frac{1}{12345}$ |
| $\frac{\phantom{1}\phantom{2}\phantom{3}\phantom{4}\phantom{5}1}{1\,2\,3\,4\,5\,6}$ | 5 | 2 | $\frac{\phantom{1}\phantom{2}\phantom{3}1\phantom{5}\phantom{6}}{1\,2\,3\,4\,5\,6}$ | $\frac{1}{123456}$ |
| $\frac{\phantom{1}\phantom{2}\phantom{3}\phantom{4}\phantom{5}\phantom{6}1}{1\,2\,3\,4\,5\,6\,7}$ | 6 | 3 | $\frac{\phantom{1}\phantom{2}\phantom{3}1\phantom{5}\phantom{6}\phantom{7}}{1\,2\,3\,4\,5\,6\,7}$ | $\frac{1}{1234567}$ |

Fig. 7

| | KEY OPERATION | DISPLAY | | NOTES |
| --- | --- | --- | --- | --- |
| | | MAIN DISPLAY | FRACTION DISPLAY | |
| A | [3] [0] [a b/c] [1] [4] | | $\frac{3}{1}\ \frac{0}{4}$ | INPUT FRACTION |
| B | [=] | 2 | $\frac{1}{7}$ | DETERMINE FRACTION |
| C | [7] [2] [a b/c] [1] [5] [a b/c] [2] [7] | 7 2 | $\frac{1}{2}\ \frac{5}{7}$ | INPUT FRACTION |
| D | [=] | 7 2 | $\frac{5}{9}$ | DETERMINE FRACTION |

Fig. 9

| KEY OPERATION | DISPLAY | |
|---|---|---|
| | MAIN DISPLAY | NUMERATOR DISPLAY / DENOMINATOR DISPLAY |
| A   [1][2][3][a b/c][4][5][6] | | 1 2 3 |
| | | 4 5 6 |
| B   [1][a b/c][2][a b/c][3][=] | 1 | 2 |
| | | 3 |
| C   [1][.][2][3][4][5][6][7][8][9][1] | 1.2 3 4 5 6 7 8 9 1 | |
| D   [EXP] | 1.2 3 4 5 6 7 8 9 1 | 0 0 |
| E   [9][9] | 1.2 3 4 5 6 7 8 9 1 | 9 9 |
| F   [2][√] | 1.4 1 4 2 1 3 5 6 2 | |
| G   [6][9][2ndF][n/] | 1.7 1 1 2 2 4 5 2 4 | 9 8 |

Fig. 11

| | KEY OPERATION | DISPLAY | | NOTES |
|---|---|---|---|---|
| | | MAIN DISPLAY | FRACTION DISPLAY | |
| A | [3] [/] [9] [9] [9] | | $\frac{3}{9}\frac{9}{9}\frac{9}{9}$ | INPUT FRACTION |
| B | [=] | | $\frac{1}{3}\frac{3}{3}\frac{3}{3}$ | DETERMINE FRACTION |
| C | [3] [5] [5] [/] [3] | | $\frac{3}{5}\frac{5}{5}\frac{5}{3}$ | INPUT FRACTION |
| D | [=] | 118 | $\frac{1}{3}$ | DETERMINE FRACTION |
| E | [a/b] | | $\frac{3}{5}\frac{5}{5}\frac{5}{3}$ | MIXED →IMPROPER |

Fig. 12

| | KEY OPERATION | DISPLAY | | NOTES |
|---|---|---|---|---|
| | | MAIN DISPLAY | FRACTION DISPLAY | |
| A | 3 0 / 1 4 | | $\frac{3}{1} \frac{0}{4}$ | INPUT FRACTION |
| B | = | 2 | $\frac{1}{7}$ | DETERMINE FRACTION |
| C | 7 2 / 1 5 / 2 7 | 7 2 | $\frac{1}{2} \frac{5}{7}$ | INPUT FRACTION |
| D | = | 7 2 | $\frac{5}{9}$ | DETERMINE FRACTION |

| | KEY OPERATION | DISPLAY | |
|---|---|---|---|
| | | MANTISSA DISPLAY | EXPONENT DISPLAY |
| A | [1][.][2][3][4][5][6][7][8][9][1] | 1.2 3 4 5 6 7 8 9 1 | |
| B | [EXP] | 1.2 3 4 5 6 7 8 9 1 | 0 0 |
| C | [9][9] | 1.2 3 4 5 6 7 8 9 1 | 9 9 |
| D | [2][√] | 1.4 1 4 2 1 3 5 6 2 | |
| E | [6][9][2nd F][n√] | 1.7 1 1 2 2 4 5 2 4 | 9 8 |

ELECTRONIC COMPUTER WITH FRACTION AND EXPONENT DISPLAY

BACKGROUND OF THE INVENTION

1. Field of the Invention:

This invention relates to an electronic computer, and more particularly to an electronic computer such as a portable electronic calculator having a display.

2. Description of the Prior Art:

FIG. 10 shows a conventional portable electronic calculator. The calculator of FIG. 10 comprises a liquid crystal display (LCD) 51, a fraction entry key 52, numeric keys 53 for entering numbers, an equal [=] key 54, and an [a/b] key 55 for converting a mixed fraction to an improper fraction or vice versa. The LCD 51 comprises a main display area 51$a$, and a fraction display section 51$b$ which includes a numerator display area 51$c$ and a denominator display area 51$d$. When a fraction is to be displayed on the LCD 51, the numerator and denominator of the fraction are displayed on the numerator display area 51$c$ and the denominator display area 51$d$, respectively. In the case of displaying a mixed fraction, the integral part of the mixed fraction is displayed on the main display area 51$a$.

In the calculator of FIG. 10, a fraction can be input in the following manner. First, the numerator is entered using the numeric keys 53, and then the fraction entry key 52 is pressed to determine the entry of the numerator (rows A and C in FIG. 11). Next, the denominator is entered, and when the [=] key 54 or another key is pressed, the entry of the denominator is determined while the resulting fraction is reduced to the lowest term if reducible (rows B and D in FIG. 11). When the [a/b] key 55 is pressed, the conversion from an improper fraction to a mixed fraction or vice versa is conducted (row E in FIG. 11).

In a conventional calculator, as can be seen from rows B and E in FIG. 11, a fraction is displayed with both the numerator and denominator aligned to the right. When there is a difference between the number of digits of the numerator and that of the denominator, therefore, the numerator or the denominator, whichever smaller, looks squeezed to the right on the display as compared with the other, making it difficult for the operator to quickly and correctly recognize the displayed fraction. In particular, this problem becomes more serious when there is a great difference between the number of digits of the numerator and that of the denominator.

FIG. 12 shows other examples of key operations for inputting fractions and their displayed results. As shown in rows B and D in FIG. 12, in the case of displaying a mixed fraction, the numerator and denominator of the fraction as well as the integral part thereof are right-justified on the LCD 51. This leaves blank space between the integral part and fractional part of the mixed fraction displayed on the LCD 51, making it difficult for the operator to quickly and correctly recognize the mixed fraction on the display.

On the other hand, in a portable electronic calculator, calculation results are sometimes obtained and displayed in exponential notation mainly because of a limit to the maximum number of digits available for arithmetical calculations within the calculator. To display a number, obtained as a result of an arithmetical calculation, etc., in exponential notation, a conventional calculator has a display such as shown in FIG. 13. The display of FIG. 13 includes a mantissa display section 151 for displaying the mantissa of the number and an exponent display section 152 for displaying the exponent of the number.

FIG. 14 shows examples of key operations on a calculator equipped with the display of FIG. 13 and their displayed results. Rows A to C in FIG. 14 show a sequence for entering a number $1.234567891*10^{99}$. First, the mantissa (1.234567891) is entered (row A in FIG. 14). In this state, the entered mantissa is displayed on the mantissa display section 151, but since the exponent is not entered yet, nothing is displayed on the exponent display section 152. Next, when an "EXP" key is pressed, the entry of an exponent is enabled, the enabled state being indicated by "00" on the exponent display section 152 (row B in FIG. 14). Row C in FIG. 14 shows that the entered exponent (99) is displayed on the exponent display section 152. Row D in FIG. 14 shows a sequence for calculating $\sqrt{2}$ (the square root of 2). Since no exponent results from the calculation, the exponent display section 152 displays nothing. Row E in FIG. 14 shows a sequence for calculating 69? (the factorial of 69). The calculation result shows $1.711224524*10^{98}$. As shown in row E in FIG. 14, the mantissa of the result, "1.711224524", is displayed on the mantissa display section 151, while the exponent "98" is shown on the exponent display section 152.

As described above, a conventional calculator has a dedicated display section for displaying the exponent of a number expressed in exponential notation. On the other hand, in the field of calculators, it is desirable that fractions be displayed in a format closer to the usual representation in order to enhance operability. If a conventional calculator is to be further equipped with a display section for displaying a fraction, however, the problem is that the entire display will become complicated and expensive in construction.

SUMMARY OF THE INVENTION

The electronic computer of this invention, which overcomes the above-discussed and numerous other disadvantages and deficiencies of the prior art, comprises: display means, said display means including a first multiple-digit display area for displaying the numerator of a fraction, and a second multiple-digit display area for displaying the denominator of the fraction; means for obtaining the number of digits of the numerator of a fraction to be displayed; means for obtaining the number of digits of the denominator of said fraction; comparison means for comparing said number of digits of said numerator and said number of digits of said denominator; calculation means for calculating the difference between said number of digits of said numerator and said number of digits of said denominator; and means for, when said number of digits of said numerator is smaller than said number of digits of said denominator, displaying said numerator on said first display area with its position shifted to an upper digit place according to the difference calculated by said calculation means, and for, when said number of digits of said denominator is smaller than said number of digits of said numerator, displaying said denominator on said second display area with its position shifted to an upper digit place according to the difference calculated by said calculation means.

In another aspect, the electronic computer according to the invention comprises: display means, said display means including a first multiple-digit display area for displaying the numerator of a fraction, a second multiple-digit display area for displaying the denominator of the fraction, and a third multiple-digit display area for displaying the integral part of a mixed fraction; process means for displaying at least one of the numerator and denominator of a fraction to be displayed, at the position of the corresponding one of said first and second display areas, said position being closest to said third display area.

In the computer, said first display area may be positioned above said second display area, and said third display area is positioned at the left of said first and second display areas.

In a further aspect, the electronic computer according to the invention comprises: display means including a fraction display section for displaying a fraction; and process means for, when a number in exponential notation is to be displayed, displaying the exponent of said number on said fraction display section.

In the computer, said fraction display section may include a first multiple-digit display area for displaying the numerator of a fraction, a second multiple-digit display area for displaying the denominator of the fraction, and the exponent of said number is displayed on said first display area.

Thus, the invention described herein makes possible the objectives of:

(1) providing an electronic computer which is capable of displaying a fraction in such a manner that the operator can quickly recognize the fraction;

(2) providing an electronic computer which is capable of displaying a fraction in such a manner that the operator can correctly recognize the fraction;

(3) providing an electronic computer which is capable of displaying a mixed fraction in such a manner that the operator can quickly recognize the mixed fraction;

(4) providing an electronic computer which is capable of displaying a mixed fraction in such a manner that the operator can correctly recognize the mixed fraction; and (5) providing an electronic computer which is capable of displaying a fraction as well as a number expressed in exponential notation using a display of simple construction.

BRIEF DESCRIPTION OF THE DRAWINGS

This invention may be better understood and its numerous objects and advantages will become apparent to those skilled in the art by reference to the accompanying drawings as follows:

FIG. 4 shows examples of key operations and their displayed results in the calculator of FIG. 1.

FIG. 5 shows examples of the display shaping according to the flow of FIG. 4.

FIG. 7 shows examples of key operations and their displayed results in the other embodiment.

FIG. 9 shows examples of key operations and their displayed results in the further embodiment.

FIG. 11 shows examples of key operations and their displayed results in the calculator of FIG. 10.

FIG. 12 shows examples of key operations for inputting fractions and their displayed results in a conventional calculator.

DESCRIPTION OF THE PREFERRED EMBODIMENTS

Figure 1:
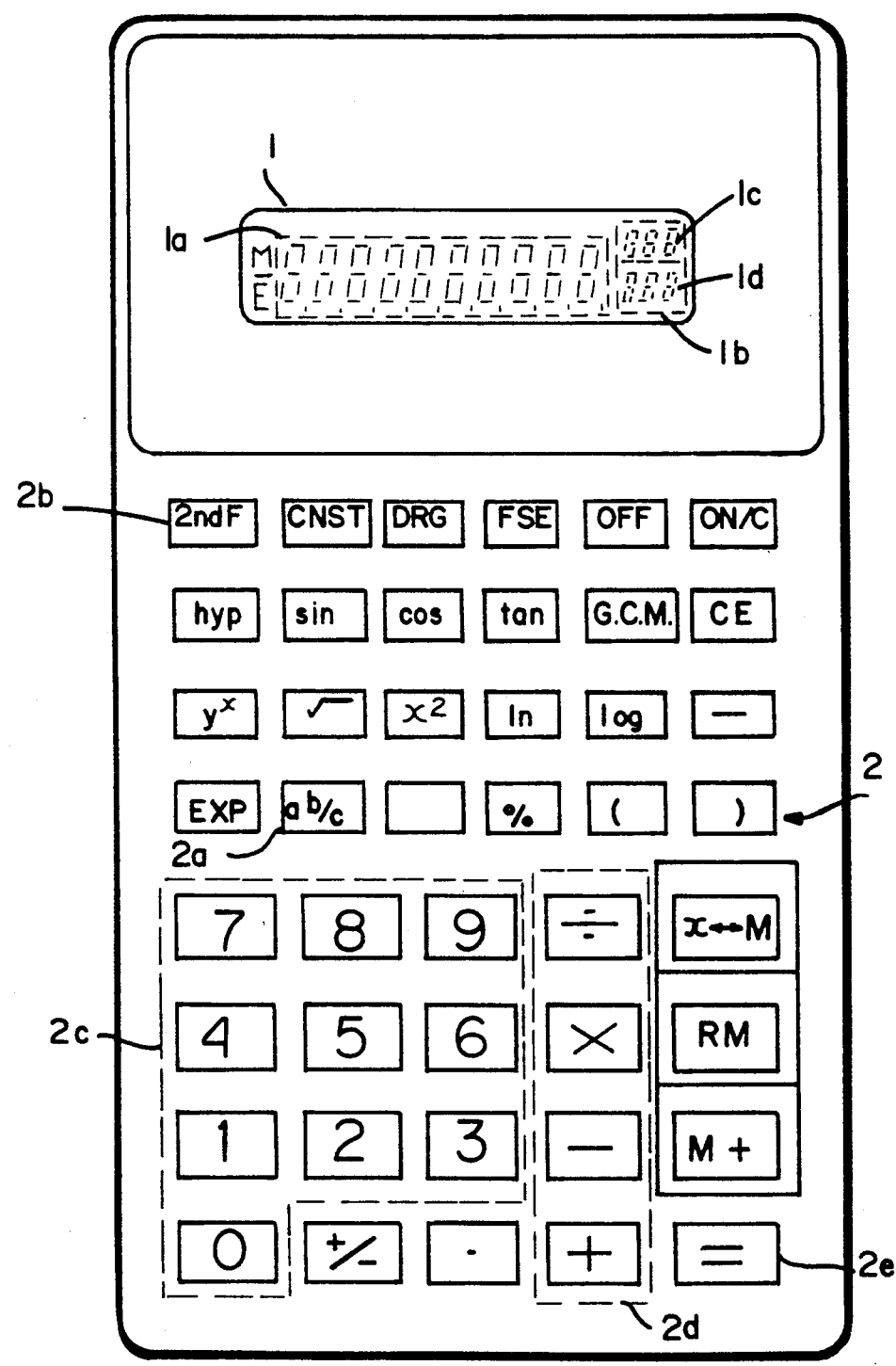
FIG. 1 shows a portable electronic calculator according to the invention.

FIG. 1 shows an electronic calculator according to the invention. The calculator of FIG. 1 is a scientific calculator capable of performing a variety of scientific calculations. With regard to the keys, the following description only deals with the keys related to the entry, display, etc. of fractions. The calculator of this embodiment includes a liquid crystal display (LCD) 1 and a keyboard 2. The LCD 1 comprises a main display section 1a and a fraction display section 1b for displaying a fraction, etc. In displaying an improper fraction, the numerator is displayed on a numerator display area 1c in the upper part of the fraction display section 1b, and the denominator on a denominator display area 1d in the lower part thereof. In the case of a mixed fraction, the integral part of the mixed fraction is displayed on the main display section 1a. The keyboard 2 comprises an $[a^b/c]$ key 2a for converting a mixed fraction to an improper fraction or vice versa, a second function key 2b for choosing functions of the $[a^b/c]$ key 2a and other keys, numeral keys 2c for entering the numbers 0 to 9, arithmetic function keys 2d for performing arithmetic, and an equal [=] key 2e.

Figure 2:
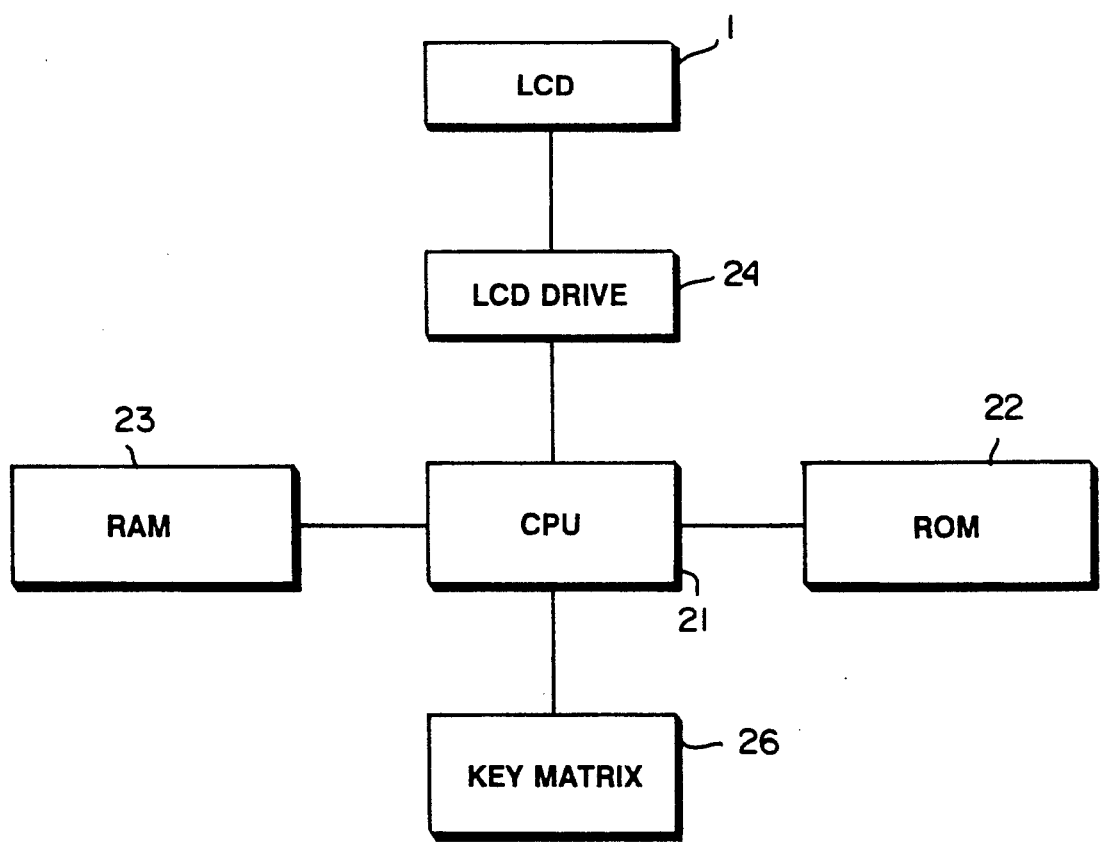
FIG. 2 is a block diagram of the calculator of FIG. 1.

FIG. 2 shows a block diagram of this embodiment. Coupled to a CPU 21 are a ROM 22 in which programs and constants are held, a RAM 23 for storing control data and numeric data, and a key matrix 26 for detecting key entries from the keyboard 2. The LCD 1 is coupled to the CPU 21 via an LCD driving circuit 24 which controls the driving of the LCD 1.

The manner of inputting a fraction in the calculator of FIG. 1 will be described. When an improper fraction is to be input, first the numerator is entered using the numeric keys 2c, and then, the $[a^b/c]$ key 2a is pressed to determine the entry of the numerator. Next, the denominator is entered using the numeric keys 2c, and the entry of the fraction is determined when any of the arithmetic function keys 2d, the equal [=] key 2e, etc. is pressed. To input a mixed fraction, first the integral part of the mixed fraction is entered using the numeric keys 2c, and after pressing the $[a^b/c]$ key 2a to determine the entry of the integral part, the fractional part of the mixed fraction is entered in accordance with the same procedure as for inputting an improper fraction. At the same time that the entry of a fraction is determined by pressing the arithmetic function keys 2d, the equal [=] key 2e, etc., the fraction is reduced to the lowest term if reducible, and converted into a mixed fraction if convertible. The conversion between improper fraction and mixed fraction is accomplished by pressing the second function key 2d followed by the [a^b/c] key 2a.

Figure 3:
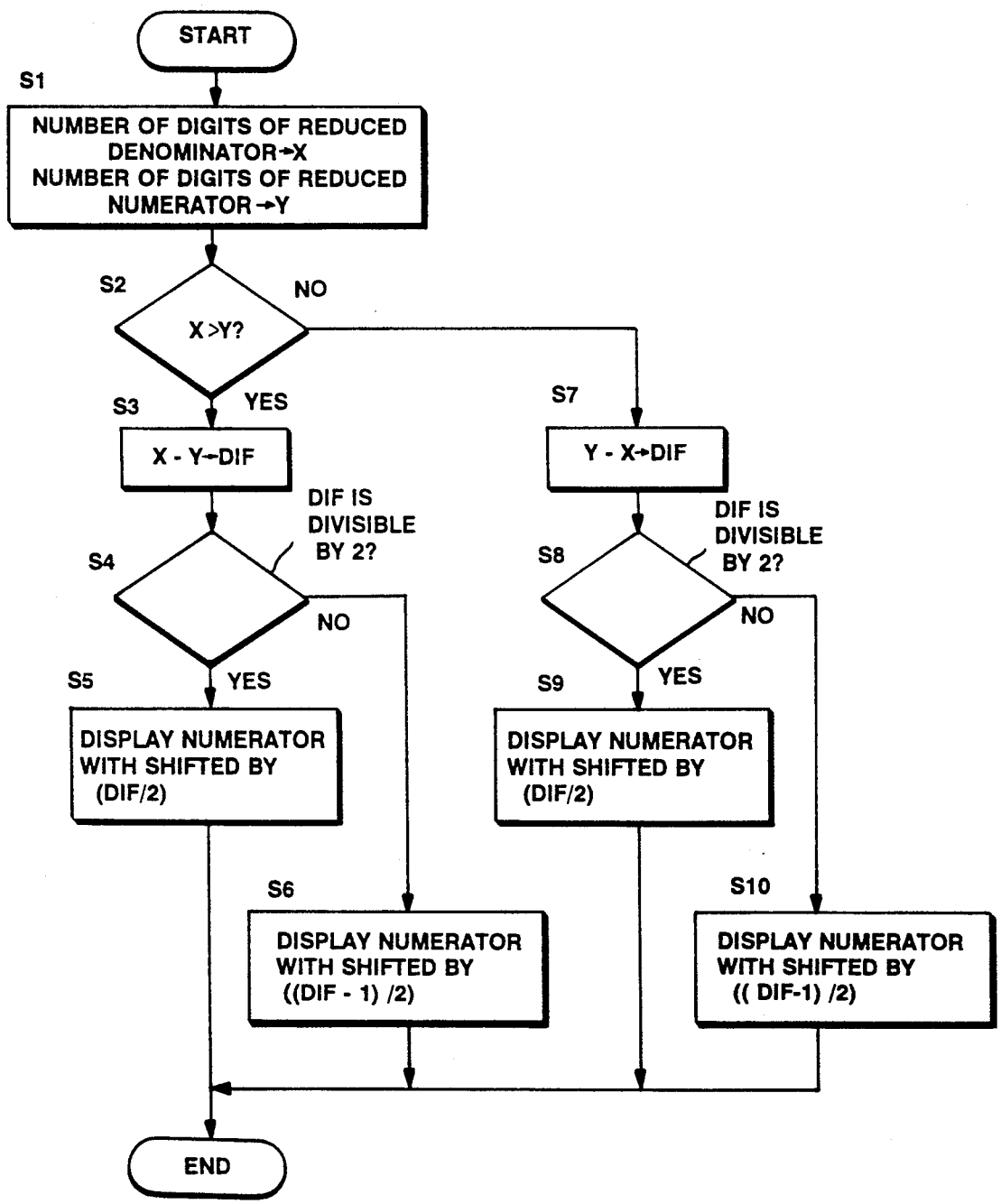
FIG. 3 is a flowchart showing an algorithm for processing the display of a fraction in the calculator of FIG. 1.

FIG. 3 shows an algorithm for processing the display of a fraction entered by pressing the arithmetic function keys 2d, the equal [=] key 2e, etc. In FIG. 3, X, Y and DIF respectively indicate variables for storing the number of digits of the denominator after reduction, the number of digits of the numerator after reduction, and the difference between the number of digits of the denominator and that of the numerator. A memory location is assigned on the RAM 23 for each of these variables.

First, the numbers of digits of the denominator and numerator are obtained after performing arithmetic operation, reduction, etc. on the fraction entered, and are saved in X and Y respectively (step S1). Next, in step S2, X and Y are compared, and the process proceeds to step S3 when X is greater than Y, and to step S7 when X is smaller than or equal to Y.

In step S3, the number of digits of the numerator Y is subtracted from that of the denominator X, and the result is saved in DIF. In step 4, it is judged if DIF is divisible by 2, and when judged divisible, the numerator is displayed on the numerator display area 1c (FIG. 1) with its position shifted to a higher order position, i.e., to the left, by (DIF/2) digits (step S5). When DIF is judged indivisible by 2, the numerator is displayed on the numerator display area 1c with its position shifted to the left by ((DIF-1)/2) digits (step S6). When the processing per steps S5 and S6 is done, the denominator is right-justified on the denominator display area 1d (FIG. 1).

In step S7, the number of digits of the denominator X is subtracted from that of the numerator Y, and the result is saved in DIF. Next, it is judged if DIF is divisible by 2 (step S8), and when judged divisible, the denominator is displayed on the denominator display area 1d with its position shifted to the left by (DIF/2) digits (step S9). When DIF is judged indivisible by 2, the denominator is displayed on the denominator display area 1d with its position shifted to the left by ((DIF-1)/2) digits (step S10). When the processing per steps S9 and S10 is done, the numerator is right-justified on the numerator display section 1c FIG. 4 shows examples of key operations according to this embodiment and their displayed results. A fraction entered as shown in row A in FIG. 4 is determined by pressing the equal [=] key 2e, and, at the same time, reduced to the lowest term as shown in row B in FIG. 4. Since the number of digits of the numerator to be displayed is smaller than that of the denominator, the numerator is displayed with its position shifted to the left so that the numerator is centered with respect to the denominator. As shown in rows C and D in FIG. 4, when the numerator of the entered fraction is greater than the denominator, the entered fraction is converted into a mixed fraction when the equal [=] key 2e is pressed to determine the entry. Row E in FIG. 4 shows the key operation for conversion from mixed fraction to improper fraction. In this example, since the number of digits of the denominator is smaller than that of the numerator after conversion into the improper fraction, the denominator is displayed with its position shifted to the left.

In this embodiment, the fraction display section 1b is capable of displaying a maximum of three digits for each of the numerator and denominator of a fraction, but when a display is used which can display a fraction having a larger number of digits, display shaping is performed as shown in FIG. 5 in accordance with the algorithm shown in FIG. 3. As can be seen from FIG. 5, since the fraction is displayed in a format closer to handwriting, the displayed fraction is that much easier for the operator to recognize.

Figure 6:
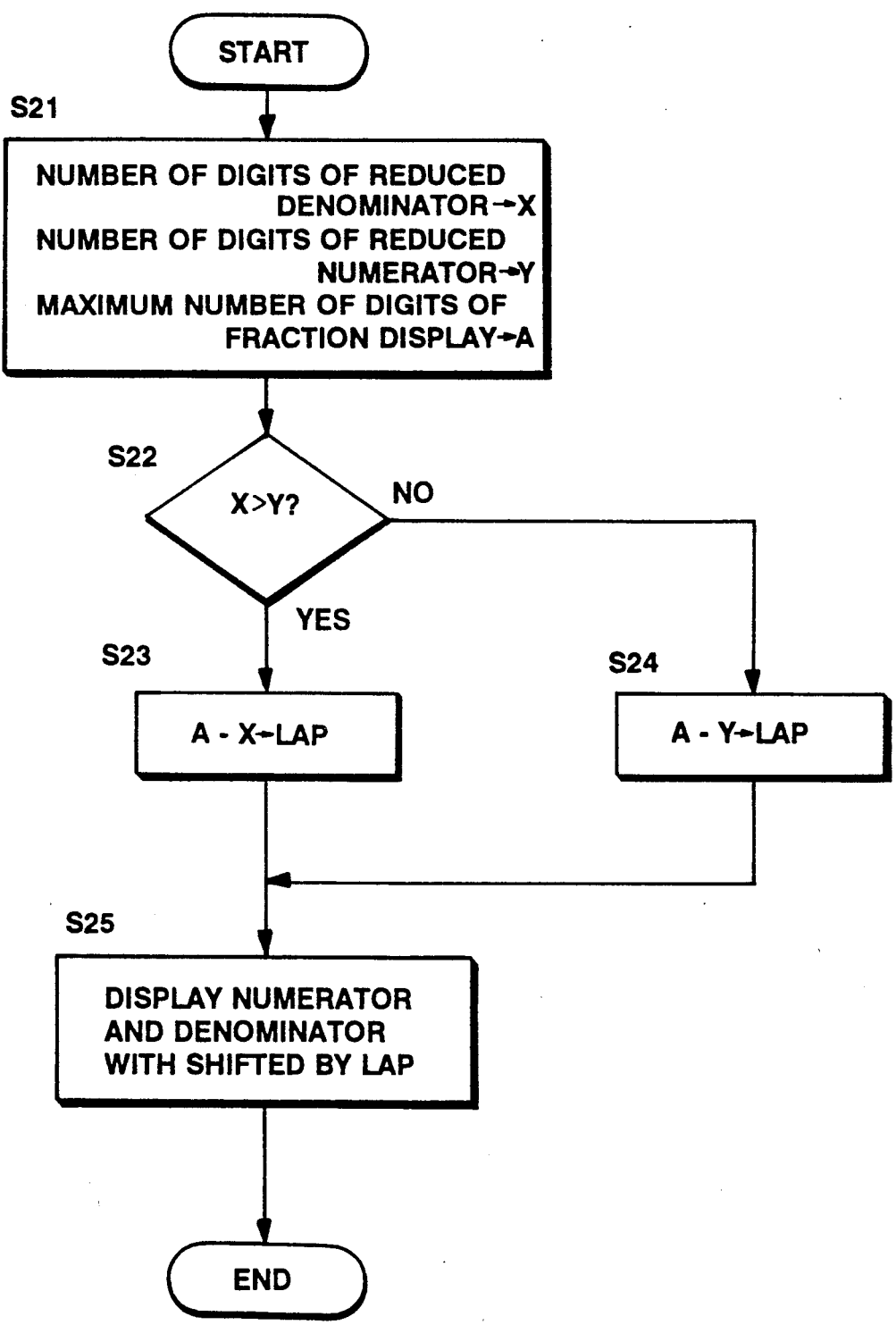
FIG. 6 is a flowchart showing an algorithm for processing the display of a fraction in another embodiment of the invention.

FIG. 6 shows an algorithm for processing the display of a fraction entered in another calculator according to the invention which has a similar structure as the calculator of FIG. 1. In FIG. 6, X, Y and A respectively indicate variables for storing the number of digits of the denominator after reduction, the number of digits of the numerator after reduction, and the maximum number of digits capable of being displayed on the fraction display section 1b. A memory location is assigned on the RAM 23 for each of these variables.

First, the numbers of digits of the denominator and numerator are obtained after performing arithmetic operation, reduction, etc., on the fraction entered, and are saved in X and Y respectively (step S21). Further, in step S21, the maximum number of digits capable of being displayed on the fraction display section 1b is obtained and saved in A. Next, in step S22, X and Y are compared, and the process proceeds to step S23 when X is greater than Y, and to step S24 when X is smaller than or equal to Y.

In step S23, the number of digits of the denominator X is subtracted from the maximum number of digits A, and the result is saved in a variable LAP. In step S24, the number of digits of the numerator Y is subtracted from the maximum number of digits A, and the result is saved in the variable LAP. As a result of processing per S22 and S23 or S24, the result obtained by subtracting the number of digits of the denominator X or that of the numerator Y, whichever greater, from the maximum number of digits A is saved in the variable LAP. In step S25, the denominator or the numerator is displayed on the denominator display area 1d (FIG. 1) or the numerator display area 1c (FIG. 1) with its position shifted to a higher order position, i.e. to the left, by the digits equal to the variable LAP.

The algorithm shown in FIG. 6 can be applied for displaying mixed fractions only or for displaying both mixed fractions and improper fractions.

FIG. 7 shows examples of key operations according to this embodiment and their displayed results. A fraction entered as shown in row A in FIG. 7 is determined by pressing the equal [=] key 2e as shown in row B in FIG. 7. At the same time, the fraction is reduced to the lowest term and converted into a mixed fraction. Also, the fractional part of the mixed fraction is left-justified on the fraction display section 1b, in accordance with the algorithm shown in FIG. 6, so that it is positioned closest to the main display section 1a. Row C in FIG. 7 shows the sequence for entering a mixed fraction. When the entry of the mixed fraction is determined by pressing the equal [=] key 2e as shown in row D in FIG. 7, the fractional part is left-justified on the display. In row D in FIG. 7 also, the fractional part is reduced to the lowest term.

In the above embodiment, as can be seen from the flowchart of FIG. 6, both the numerator and the denominator are displayed with their positions shifted by the same number of digits, therefore, the numerator and the denominator on the display are aligned on the right. However, this is not essential for the present invention, and the numerator or the denominator, whichever smaller in the number of digits, may be shifted to the left with respect to the other so that the numerator and the denominator are aligned on the left.

Since the fractional part and integral part of a mixed fraction are displayed without leaving blank space between them, the electronic calculator of this embodiment can provide improved operability, enabling the operator to quickly recognize the mixed fraction on the display.

Figure 8:
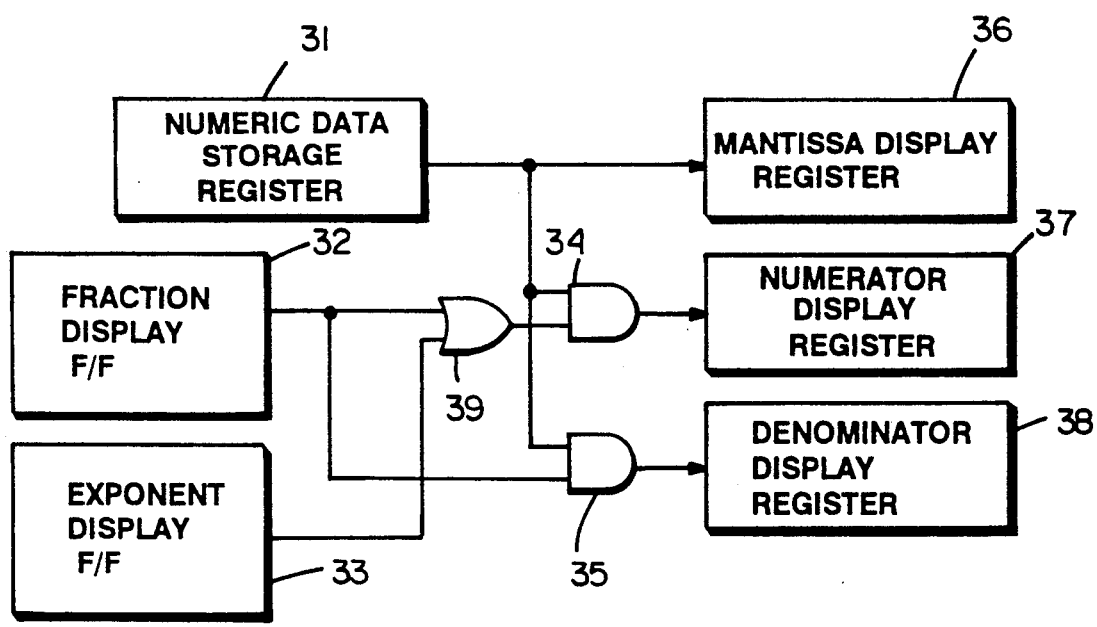
FIG. 8 is a block diagram showing the essential part of a circuit associated with the display of a further embodiment of the invention.
Figure 10:
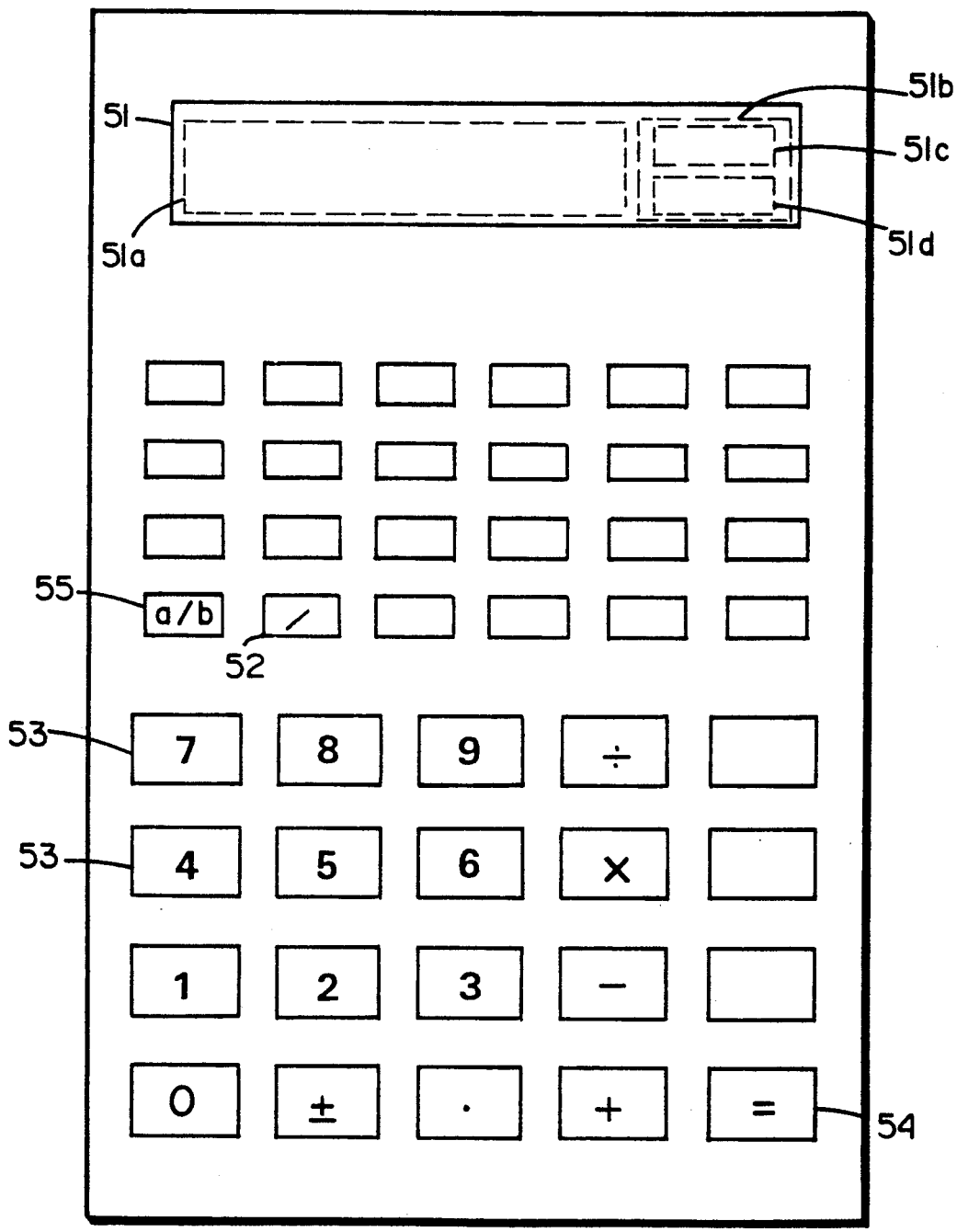
FIG. 10 shows a conventional portable electronic calculator.
Figures 13, 14:
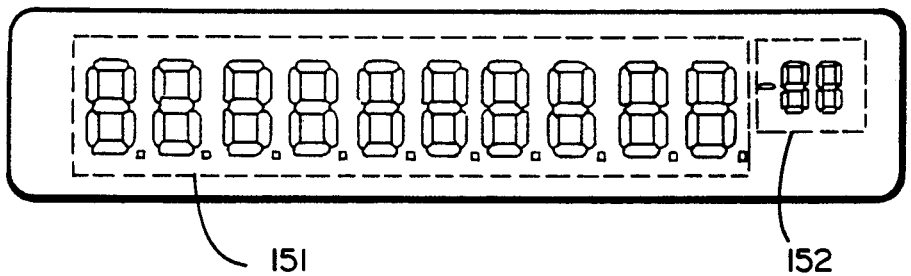
FIG. 13 shows a display of a conventional calculator having a mantissa display section.
FIG. 14 shows examples of key operations and their displayed results in the calculator having the display of FIG. 13.

FIG. 8 shows the essential part of a circuit associated with the display of a further electronic calculator according to the invention which has a similar structure as the calculator of FIG. 1. Before describing the circuit shown in FIG. 8, the keys which are necessary for describing this embodiment but have not yet described in the description of the foregoing embodiments will be described. As [EXP] key 2f is used for entering an exponent, a square root [√] key 2g is used for obtaining the square root of a number, and an [n?] key 2h has a factorial calculation function as the second function. In displaying a number in exponential notation, the mantissa of the number is displayed on the main display section 1a, while the exponent thereof is shown on the fraction display section 1b.

Referring to FIG. 8, Numeric data to be displayed is stored in a numeric data storage register 31. A fraction display flip-flop 32 is set to output "1" when displaying a fraction, and is reset to output "0" when displaying other types of number. An exponent display flip-flop 33 is set when displaying a number in exponential notation, and reset when displaying a number in other notation. A display pattern to be displayed on the main display section 1a is stored in a mantissa display register 36. A display pattern to be displayed on the numerator display area 1c and a display pattern to be displayed on the denominator display area 1d are respectively stored in a numerator display register 37 and a denominator display register 38. In other words, the main display section 1a, the numerator display area 1c, and the denominator display area 1d provide displays according to the contents of the mantissa display register 36, numerator display register 37, and denominator display register 38, respectively. A gate 39 outputs a "1" if any one of the outputs of the fraction display flip-flop 32 and exponent display flip-flop 33 is "1". A gate 34 allows the data in the numeric data storage register 31 to be transferred to the numerator display register 37 when the output of the gate 39 is "1". A gate 35 allows the data in the numeric data storage register 31 to be transferred to the denominator display register 38 when the output of the fraction exponent display flip-flop 32 is "1".

The operation of the circuit of FIG. 8 will be described. To display a fraction, first the fraction display flip-flop 32 is set, and "1" is given from the gate 39 to the gate 34. This causes the data in the numeric data storage register 31 to be transferred to the numerator display register 37 via the gate 34. Based on this data, a display pattern corresponding to the numerator to be displayed is formed in the numerator display register 37. Since "1" is given from the fraction display flip-flop 32 to the gate 35, the data in the numeric data storage register 31 is transferred to the denominator display register 38 via the gate 35. Based on this data, a display pattern corresponding to the denominator to be displayed is formed in the denominator display register 38. Furthermore, in the case of a mixed fraction, a display pattern corresponding to the integral part of the mixed fraction to be displayed is formed in the mantissa display register 36 based on the data from the numeric data storage register 31.

To display a number in exponential notation, the exponent display flip-flop 33 is set, while the fraction display flip-flop 32 is reset. In this state, "1" is input to the gate 34 from the gate 39, and "0" is input to the gate 35 from the fraction display flip-flop 32. Therefore, the data in the numeric data storage register 31 is transferred to the mantissa display register 36 and the numerator display register 37, but not transferred to the denominator display register 38. This means that no display pattern is formed in the denominator display register 38, hence the denominator display area 1d being set in the off condition. A display pattern corresponding to the mantissa of the number is formed in the mantissa display register 36 based on the data from the numeric data storage register 31. Also, a display pattern corresponding to the exponent of the number is formed in the numerator display register 37 based on the data from the numeric data storage register 31.

To display a number with no exponent, the fraction display flip-flop 32 and the exponent display flip-flop 33 are both reset. Therefore, the data in the numeric data storage register 31 is not transferred either to the numerator display register 37 or to the denominator display register 38. This means that no display pattern is formed either in the numerator display register 37 or in the denominator display register 38, hence both the numerator display area 1c and the denominator display area 1d being set in the off condition. On the other hand, a display pattern corresponding to the mantissa of the number is formed in the mantissa display register 36.

FIG. 9 shows examples of key operations according to this embodiment and their displayed results. Rows A and B in FIG. 9 show a sequence for entering an improper fraction and a mixed fraction, respectively. As shown in row A in FIG. 9, the numerator and denominator of the improper fraction are displayed on the numerator display area 1c and denominator display area 1d, respectively. As shown in row B in FIG. 9, in the case of a mixed fraction, the integral part of the mixed fraction is displayed on the main display section 1a. Rows C to E in FIG. 9 show a sequence for entering a number in exponential notation. As shown in rows D and E in FIG. 9, the exponent of the number is displayed on the numerator display area 1c. Rows F and G in FIG. 9 show a sequence for a square root and a factorial calculation, respectively. In row F in FIG. 9, since no exponent results from the calculation, the numerator display area 1c displays nothing. Row G in FIG. 9 shows that the exponent of the calculation result is displayed on the numerator display area 1c.

According to this embodiment, displaying of a fraction and displaying of a number in exponential notation can be accomplished using a display of simple construction.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A handheld electronic calculator comprising:
   display means, said display means including a first multiple-digit display area for displaying a numerator of a fraction, and a second multiple-digit display area for displaying a denominator of the fraction, said numerator and said denominator each having a respective number of digits;
   means for determining the number of digits of the numerator of said fraction;
   means for determining the number of digits of the denominator of said fraction;
   calculation means for calculating a difference between said number of digits of said numerator and said number of digits of said denominator; and
   means for, when said number of digits of said numerator is smaller than said number of digits of said denominator, displaying said numerator on said first display area at a position shifted to an upper digit place according to said difference, and for, when said number of digits of said denominator is smaller than said number of digits of said numerator, displaying said denominator on said second display area at a position shifted to an upper digit place according to said difference.

2. A handheld electronic calculator according to claim 1, said display means further comprising:
   a third multiple-digit display area for displaying an integral part of said fraction in the event said fraction is a mixed fraction, and
   conversion means for selectively displaying said fraction as a mixed fraction and as an improper fraction.

3. A handheld electronic calculator comprising:
   display means including:
   a first multiple-digit display area for displaying a numerator of a fraction,
   a second multiple-digit display area for displaying a denominator of said fraction, and
   a third multiple-digit display area for displaying an integer of said fraction in the event said fraction is a mixed fraction;
   processing means including:
   means for determining a number of digits of the numerator of said fraction,
   means for determining a number of digits of the denominator of said fraction,
   means for selecting a largest number of digits by comparing the number of digits of the numerator with the number of digits of the denominator,
   means for selecting the largest number of digit display areas of the first and second multiple-digit display areas by comparing a number of digit display areas of said first multiple-digit display area with a number of digit display areas of said second multiple-digit display area,
   means for calculating a difference between the largest number of digits and the largest number of digit display areas,
   means for displaying said numerator shifted to an upper digit display position based on said difference, and
   means for displaying said denominator shifted to an upper digit display position based on said difference.

4. An electronic computer according to claim 3, wherein said first display area is positioned above said second display area, and said third display area is positioned at the left of said first and second display areas.

5. A handheld electronic calculator according to claim 3, wherein when a number in exponential notation is to be displayed, said processing means displays an exponent of said number in said first multiple-digit display area.

6. A handheld electronic calculator according to claim 3, wherein said processing means displays both said numerator and said denominator of said fraction at a position closest to said third display.

7. A handheld electronic calculator according to claim 3, said display means further comprising:
   conversion means for selectively displaying said fraction as a mixed fraction and as an improper fraction.

8. A handheld electronic calculator comprising:
   display means including a fraction display section for displaying a fraction including a numerator display area for displaying a numerator and an adjacent denominator display area for displaying a denominator; and
   process means for, when a number in exponential notation is to be displayed, displaying an exponent of said number on said fraction display section.

9. An electronic computer according to claim 8, wherein said fraction display section includes a first multiple-digit display area for displaying a numerator of the fraction, a second multiple-digit display area for displaying a denominator of the fraction, and the exponent of said number is displayed on said first display area.

10. A hand held electronic calculator comprising:
    display means including:
    a first multiple-digit display area for displaying a numerator of a fraction, and
    a second multiple-digit display area for displaying a denominator of the fraction, said numerator and said denominator each having a respective number of digits and said first display area being positioned above said second display area; and
    positioning means for substantially centering a digit display position of said numerator on said first display area relative to a digit display position of said denominator on said second display area.

11. A hand held electronic calculator according to claim 10, said display means further comprising:
    a third multiple-digit display area for displaying an integral part of said fraction in the event said fraction is a mixed fraction.

12. A handheld electronic calculator according to claim 11, said display means further comprising:
    conversion means for selectively displaying said fraction as a mixed fraction and as an improper fraction.

13. A handheld electronic calculator according to claim 10, wherein when a number in exponential rotation is to be displayed, said positioning means displays an exponent of said number in said first multiple-digit display area.

* * * * *

UNITED STATES PATENT AND TRADEMARK OFFICE
CERTIFICATE OF CORRECTION

PATENT NO. : 5,241,489
DATED : August 31, 1993
INVENTOR(S) : KOUMO

It is certified that error appears in the above-indentified patent and that said Letters Patent is hereby corrected as shown below:

Column 10, line 4, delete "An electronic computer" and insert --A handheld electronic calculator--;

Column 10, line 31, delete "An electronic computer" and insert --A handheld electronic calculator--;

Column 10, lines 62-63, delete "rotation" and insert --notation--.

Signed and Sealed this

Ninth Day of August, 1994

Attest:

BRUCE LEHMAN

*Attesting Officer*   *Commissioner of Patents and Trademarks*